(12) United States Patent
Lewis (10) Patent No.: US 12,457,304 B2
(45) Date of Patent: Oct. 28, 2025

(54) METHOD AND SYSTEM FOR ENABLING VIDEOCONFERENCING WITH LEGAL COUNSEL

(71) Applicant: Bradley Cornel Lewis, Hoover, AL (US)

(72) Inventor: Bradley Cornel Lewis, Hoover, AL (US)

( * ) Notice: Subject to any disclaimer, the term of this patent is extended or adjusted under 35 U.S.C. 154(b) by 231 days.

(21) Appl. No.: 18/073,135

(22) Filed: Dec. 1, 2022

(65) Prior Publication Data

US 2023/0179740 A1 Jun. 8, 2023

Related U.S. Application Data

(60) Provisional application No. 63/285,874, filed on Dec. 3, 2021.

(51) Int. Cl.
  *H04N 7/15* (2006.01)
  *H04L 12/18* (2006.01)

(52) U.S. Cl.
  CPC ......... *H04N 7/155* (2013.01); *H04L 12/1831* (2013.01); *H04L 12/1845* (2013.01)

(58) Field of Classification Search
  CPC .................................................. H04L 12/1831
  See application file for complete search history.

(56) References Cited

U.S. PATENT DOCUMENTS

| | | |
|---|---|---|
| 11,272,100 B2 | 3/2022 | Mallet |
| 2018/0025453 A1* | 1/2018 | Redmon ................. G06Q 50/18 348/14.02 |
| 2019/0318618 A1 | 10/2019 | Gilbert et al. |
| 2021/0004928 A1* | 1/2021 | Azim ..................... H04N 7/188 |

OTHER PUBLICATIONS

International Search Report and Written Opinion of the International Searching Authority, or the Declaration, Apr. 26, 2023, PCT/US2022/051666, European Patent Office.

* cited by examiner

*Primary Examiner* — Amal S Zenati
(74) *Attorney, Agent, or Firm* — Harvey S. Kauget, Esq.; Burr & Forman LLP (57) ABSTRACT

A method and system for enabling a user to video conference with legal counsel during traffic stops or other interactions with law enforcement. The method may include the steps of presenting, on the user's computing device, an option to the user to request a video conference with a legal representative; receiving, from the user's computing device, a first request for a video conference, wherein the first request includes user location information based on the user's location; identifying a legal representative by determining whether the user location information corresponds to legal representative location information association with the legal representative; transmitting a second request to the legal representative; and initiating a video conference in response to the legal representative accepting the second request.

22 Claims, 8 Drawing Sheets

Legal Representative User Flow: Mobile App

Administrator User Flow: Web Dashboard

Driver's Call Screen with Pull Up Menu

FIG. 4B

Driver's Pull Up Menu with Activity

METHOD AND SYSTEM FOR ENABLING VIDEOCONFERENCING WITH LEGAL COUNSEL

CROSS-REFERENCE TO RELATED APPLICATION

This application claims the benefit of U.S. Provisional Patent Application No. 63/285,874 filed on Dec. 3, 2021, which is incorporated herein by reference in its entirety.

TECHNICAL FIELD

The present disclosure relates generally to video conferencing, and more specifically to a method and system for enabling video conferencing with legal counsel during traffic stops or other interactions with law enforcement.

BACKGROUND

One of the slowest markets to adapt to technology has been the legal industry. The legal market is ripe with opportunity for creating efficiencies and accountability metrics. These opportunities come with external factors of societal changes such as those prior to 2020 and those that were significantly highlighted since 2020. With the culmination of a global pandemic and civil unrest came the exposure of a legal system and law enforcement departments that have limited accountability tools and a significant amount of erosion in training and management.

On a daily basis there are thousands of people that are stopped in traffic, almost 20 million a year. In 2020, New York University conducted a study that found that black drivers are 20 percent more likely to be stopped in comparison to white drivers, and are 1.5 to 2 times more likely to have their vehicle searched. Given these circumstances, there is a need to help those that are pulled over navigate this stressful time with professional legal counsel. However, many drivers do not have trusted legal counsel that they can contact on short notice, and that are licensed to practice in the relevant jurisdiction. Moreover, researching this information during a traffic stop is not practical, and even if the driver were able to identify potential legal counsel, the attorney may not be available during the traffic stop. Accordingly, there is a need to provide an on-demand service that connects drivers with vetted, available legal counsel that are licensed to practice in the relevant jurisdiction.

SUMMARY

According to an aspect of one embodiment of the present disclosure, there is provided a method for enabling a user to establish a video conference with legal counsel during traffic stops or other interactions with law enforcement. The method comprises presenting, on the user's computing device, an option to the user to request a video conference with a legal representative; receiving, from the user's computing device, a first request for a video conference, wherein the first request includes user location information based on the user's location; identifying a legal representative by determining whether the user location information corresponds to legal representative location information association with the legal representative; transmitting a second request to the legal representative; and initiating a video conference in response to the legal representative accepting the second request.

According to another aspect, once the legal representative has been identified, the method further includes determining if the identified legal representative is available. According to another aspect, if the identified legal representative does not accept the second request or is unavailable, the method further includes identifying a second legal representative by determining whether the user location information corresponds to legal representative location information association with the second legal representative and initiating a video conference with the second legal representative in response to the second legal representative accepting a third request.

According to another aspect, the user location information includes a zip code, a city, and a state where the user is located at the time of the interaction with law enforcement. According to another aspect, identifying the legal representative by determining whether the user location information corresponds to legal representative location information association with the legal representative includes determining if the legal representative is located in the same zip code as the user at the time of the interaction with law enforcement. According to another aspect, identifying the legal representative by determining whether the user location information corresponds to legal representative location information association with the legal representative includes determining if the legal representative is located in the same city as the user at the time of the interaction with law enforcement. According to another aspect, identifying the legal representative by determining whether the user location information corresponds to legal representative location information association with the legal representative includes determining if the legal representative is located in the same state as the user at the time of the interaction with law enforcement.

According to another aspect, the method further includes creating an audio/video recording of the video conference between the user and the legal representative. According to another aspect, the method includes providing access to the audio/video recording to at least one of the user and the legal representative. According to another aspect, the method includes prompting the user to activate a camera on the user's computing device to record the encounter with law enforcement. According to another aspect, the method includes accepting, from each user, various ratings of identified legal representatives who each user has had video conferences with; accepting, from each identified legal representative, various rating of users who each identified legal representative has had video conferences with; and aggregating at least one of the legal representative ratings and the user ratings to form statistics about at least one of the identified legal representatives and the users.

According to aspects of another embodiment of the present disclosure, a system for enabling a user to establish a video conference with legal counsel during traffic stops or other interactions with law enforcement, is provided. The system includes a transmitter module, a receiver module, a processor and a memory. The processor is configured to present, on the user's computing device, an option to the user to request a video conference with a legal representative. The receiver module is configured to receive, from the user's computing device, a first request for a video conference, wherein the first request includes user location information based on the user's location. The processor is configured to identify a legal representative by determining whether the user location information corresponds to legal representative location information association with the legal representative and the transmitter module configured to transmit a second request to the legal representative. The processor is configured to initiate a video conference in response to the legal representative accepting the second request.

According to another aspect, once the legal representative has been identified, the processor further is configured to determine if the identified legal representative is available. According to another aspect, if the identified legal representative does not accept the second request or is unavailable, the processor is further configured to identify a second legal representative by determining whether the user location information corresponds to legal representative location information association with the second legal representative and initiating a video conference with the second legal representative in response to the second legal representative accepting a third request.

According to another aspect, the user location information includes a zip code, a city, and a state where the user is located at the time of the interaction with law enforcement. According to another aspect, identifying the legal representative by determining whether the user location information corresponds to legal representative location information association with the legal representative includes determining if the legal representative is located in the same zip code as the user at the time of the interaction with law enforcement. According to another aspect, identifying the legal representative by determining whether the user location information corresponds to legal representative location information association with the legal representative includes determining if the legal representative is located in the same city as the user at the time of the interaction with law enforcement. According to another aspect, identifying the legal representative by determining whether the user location information corresponds to legal representative location information association with the legal representative includes determining if the legal representative is located in the same state as the user at the time of the interaction with law enforcement.

According to another aspect, the processor is further configured to create an audio/video recording of the video conference between the user and the legal representative. According to another aspect, the processor is further configured to further provide access to the audio/video recording to at least one of the user and the legal representative. According to another aspect, the processor is further configured to prompt the user to activate a camera on the user's computing device to record the encounter with law enforcement. According to another aspect, the processor further configured to accept, from each user, various ratings of identified legal representatives who each user has had video conferences with; accept, from each identified legal representative, various rating of users who each identified legal representative has had video conferences with; and aggregate at least one of the legal representative ratings and the user ratings to form statistics about at least one of the identified legal representatives and the users.

DETAILED DESCRIPTION

Reference will now be made in detail to the following various examples, which are illustrated in the accompanying drawings, wherein like reference numerals refer to like elements throughout. The following examples may be embodied in various forms without being limited to the examples set forth herein. Descriptions of well-known parts are omitted for clarity.

According to one or more examples, a method and system for enabling real-time video conferencing between a user who has been stopped by law enforcement and a legal representative may include software that resides on the user's mobile device, a server for connecting the user and the legal representative, and software that resides on the legal representative's mobile device. Alternatively, the software enabling the video conferencing may not necessarily reside solely on the user's mobile device or the legal representative device, and may reside at least partly on a server that the user and legal representative may access via the Internet. The example system or method may also allow an administrator to manage participating users and legal representatives.

Figure 1:
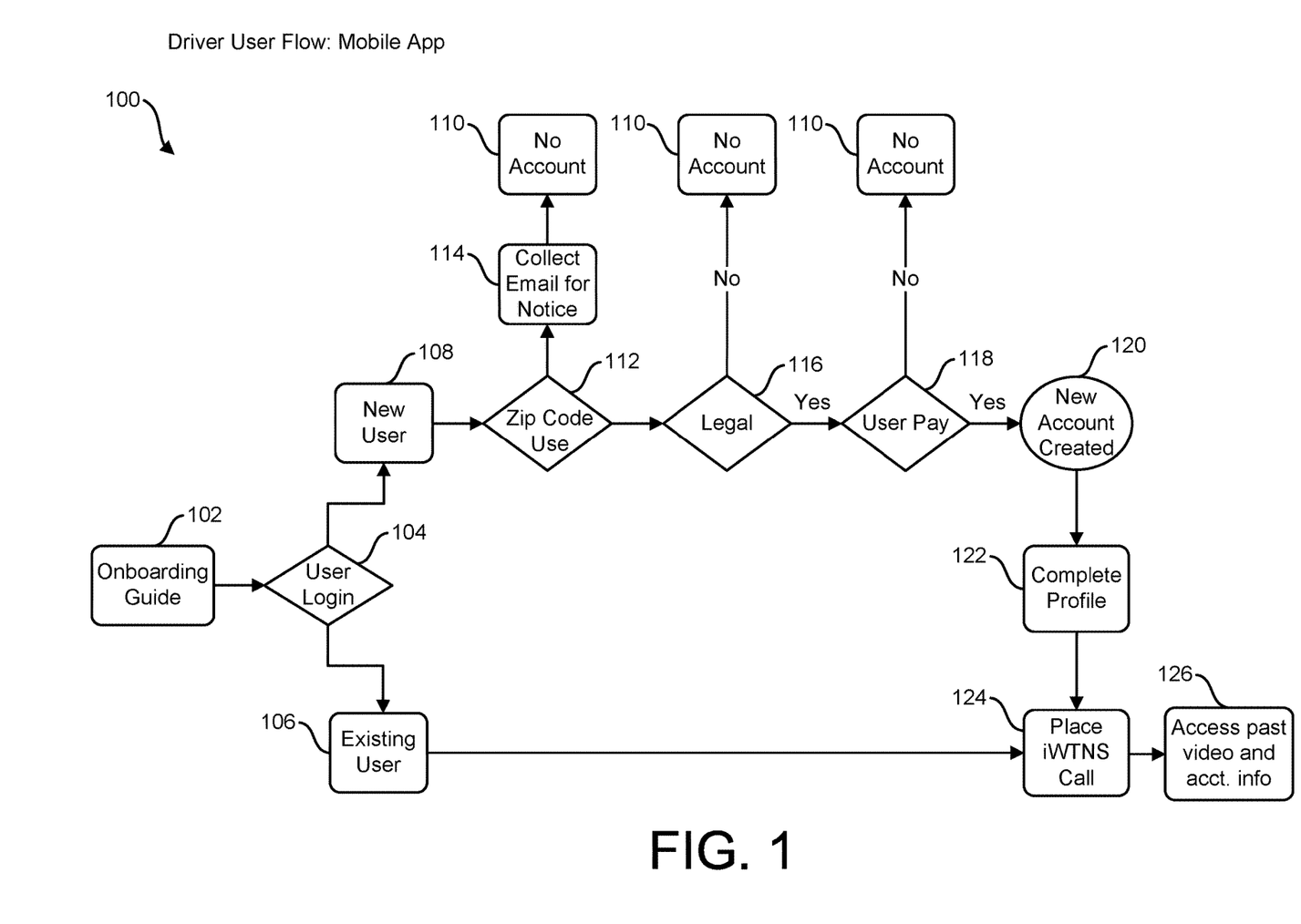
FIG. 1 shows a flowchart depicting the user-side of the method and system according to one or more examples.

FIG. 1 shows a flowchart depicting the user-side of the method and system according to an example embodiment. Referring to FIG. 1, the user-side flow 100 may begin by providing an onboarding guide, at step 102, which may include a series of images, videos, etc. that may provide instructions to the user regarding how to use the system. Once the user has viewed or otherwise progressed through the onboarding guide, the user may be prompted to provide login credentials, such as a username and password, at step 104. The system may verify the input credentials to determine if the input credentials match credentials of existing users stored in a server that is configured to store credentials of existing users. If the input credentials do not match any stored credentials of existing users, the system may display on the user's mobile device a message prompting the user to re-enter their credentials, or to register as a new user, at step 108. If the input credentials do match stored credentials of an existing user, the user may be provided with a screen that enables the user to initiate a video conference call. Alternatively, a dual authentication may be initiated, such as sending a code via SMS message, etc. to a mobile number associated with the stored credentials that matched the input credentials, and waiting for the user to input the code. If the user enters the correct code, the system may determine that the user is authenticated, and allow the user to initiate a video conference to a legal representative.

If the user is not an existing user, i.e., does not have an existing account, the system may prompt the user to create a new user profile. For example, the user may be prompted to enter the user's home zip code, or the system may obtain the user's current zip code by using the location services on the user's mobile device, at step 112. The system may also prompt the user to provide an email address in order to send notifications to the user, at step 114. The system may also prompt the user to upload an image of the user's driver's license and proof of insurance. Upon receiving the user's zip code, the system may determine whether the zip code corresponds to zip codes of participating legal representatives, at step 116. If the user's zip code does not correspond to a zip code of a participating legal representative, or is not within a state in which a participating legal representative resides or is licensed to practice law, the system may notify the user that the system is not able to establish a new profile. The system may also request payment information before creating a new user profile, at step 118. Once the user has created a new account profile at step 120 and the system has saved the user's complete profile at step 122, the system may allow the user to initiate contact with a legal representative, at step 124. In one embodiment, the system may access past video and account information, such as recordings of previous interactions with law enforcement and/or legal counsel, at step 126.

Figure 2:
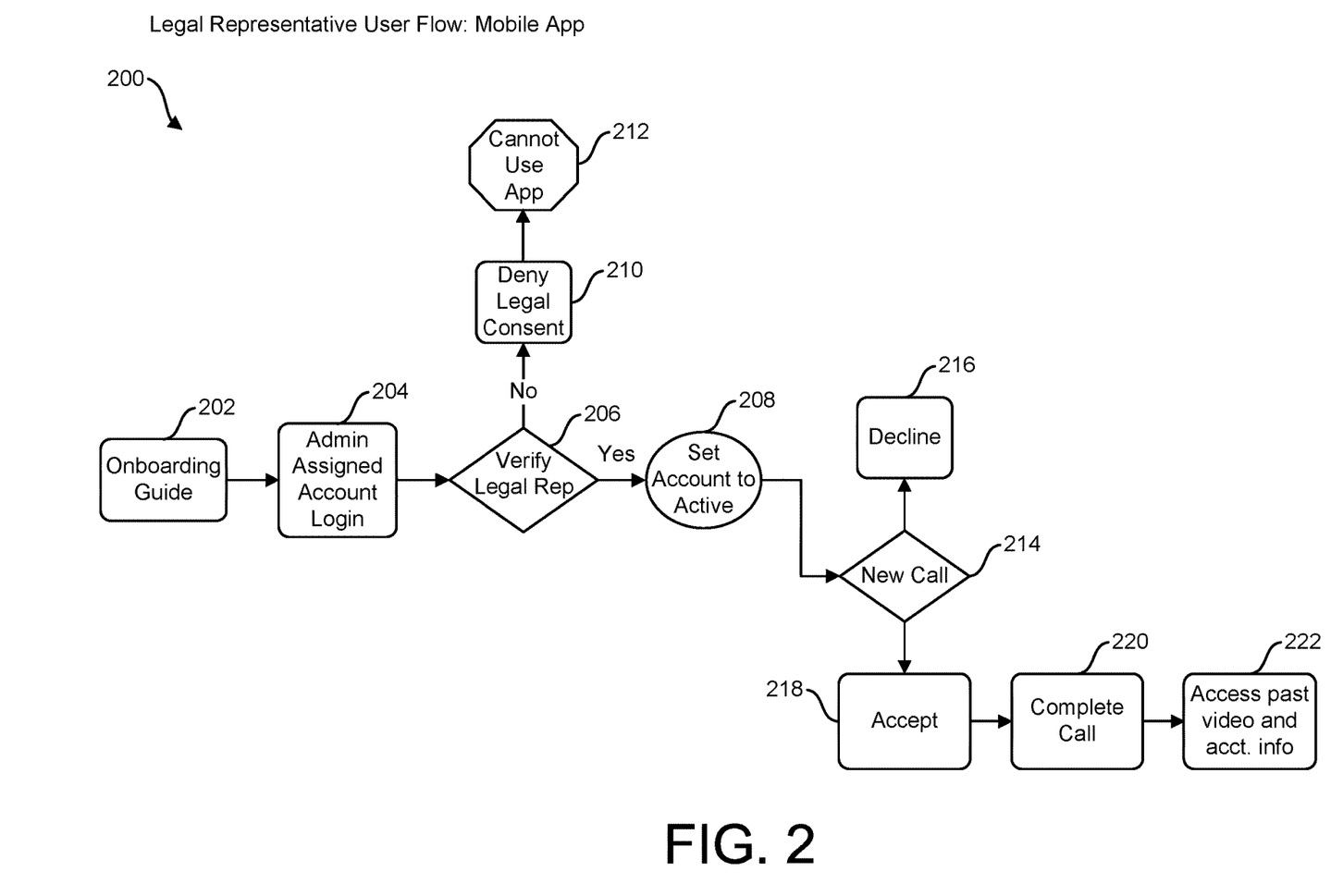
FIG. 2 shows a flowchart depicting the legal representative-side of the method and system according to one or more examples.

FIG. 2 shows a flowchart depicting the legal representative side of the method and system according to an example embodiment. Similar to FIG. 1, the legal representative side flow 200 may include providing an onboarding guide, as step 202, which may include one or more images, videos, etc. that may instruct the legal representative how to use the system. Once the legal representative has viewed or otherwise skipped the onboarding guide, the legal representative is prompted to login by entering login credentials, at step 204. If the legal representative has not previously created a profile, the system may verify the legal representative's ability to provide legal advice to a user, at step 206. For example, the system may request that the legal representative provide information indicating the legal representative's ability to practice law. For example, the system may ask the legal representative to identify the states, and corresponding bar numbers, in which the legal representative is admitted to practice. The system may also request information to identify the law school from which the legal representative graduated. Upon receiving the information from the legal representative, the system may verify the accuracy of the information provided by requesting and receiving information from a state bar database, for example, that contains the names and bar numbers of legal representatives admitted to practice in that state. Upon confirming that the legal representative is admitted to practice in at least one state, the system may create a profile for the legal representative that may include contact information for the legal representative, the states in which the legal representative is admitted to practice, the legal representative's corresponding bar numbers, and login credentials for future access to the system. Once the user has created a profile and is logged in, the system may request the legal representative to set the legal representative's profile to active or inactive, at step 208. Alternatively, the legal representative may set the profile to always be active or inactive during certain days and/or certain times of day. If the system denies the legal representative's ability to provide legal advice to a user, at step 201, then the legal representative is denied access to the system, at step 212. In addition, though not shown in FIG. 2, the system may periodically verify that the legal representative is still authorized to practice law in a given jurisdiction. For example, the system may query a database of a state bar to determine if the legal representative remains in good standing in the particular state.

Referring to FIGS. 1 and 2, when a user initiates a new call to a legal representative, at step 214, a request may be transmitted from the user's mobile device to a server. The request may include the user's current location, which may be obtained by using the location services on the user's mobile device. The request may also, or alternatively, include the city, state, and/or zip code associated with the user's profile, regardless of the user's current location. Upon receiving the request, the server may identify the profiles of legal representatives having city, state, and/or zip codes that correspond to the city, state, and/or zip code corresponding to the user's current location and/or to the user's profile. For example, the system may first attempt to identify legal representatives having a zip code corresponding to the zip code in the request. The legal representative's zip code may be the home zip code of the legal representative, or may be one or more zip codes within one or more states in which the legal representative is licensed to practice law. The zip code in the request may be the home zip code stored in the user's profile, or may be the zip code of the user's current location, as identified by a location function of the user's mobile device, such as an application that determines the user's current location using the global positioning system (GPS). The system may then verify whether the profiles of the legal representatives having a matching zip code have been set to an active state at step 208, and may trigger a push notification to the device of one of the legal representatives whose profile is active, and whose zip code matches the zip code contained in the request. If the legal representative declines the call, at step 216, or the call is otherwise not successfully connected, the system may proceed to initiate another video conference call with a different legal representative whose profile is active, and whose zip code matches the zip code contained in the request. The system may continue this process until a video conference call is successfully connected, or until there are no additional legal representative active profiles whose zip codes match the zip code provided in the request. If the call is accepted, at step 218, the system may initiate a video conference or video call that provides the legal representative with live video and audio captured by a camera on the user's mobile device. During the video call, the legal representative may communicate with the user and law enforcement officers that may be present, such as an office that has initiated a traffic stop. During the video call, the legal representative may provide legal advice in real time to the user. When the video call is ultimately completed, at step 220, the call transcript, video and audio is saved, where it can be accessed, along with previously stored video/audio conferences to those with need to view the video conference, at step 222.

If the system is unable to connect a video conference call with a legal representative whose profile includes a zip code that matches the zip code contained in the request, the system may then search for legal representative profiles having the same city as the city contained in the request. The system then proceeds to successively attempt to connect video conference calls with legal representatives having an active profile that includes a city matching the city contained in the request. If a video conference is not successfully conducted with a legal representative whose profile includes a city that matches the city contained in the request, the system may repeat the process by identifying legal representative profiles having a state that matches the state contained in the request. Although the above process has been described as checking the zip code, city, and/or state of the legal representative before verifying whether the legal representative's profile is active, the process may be reversed to first check the active status of the legal representative's profile before checking for a corresponding zip code, city, and/or state. If no legal representative having an active profile status, and a city, state, or zip code that matches the city, state, or zip code of the incoming request is identified, the system may cause to be displayed on the user's device a message that no legal representative is currently available. The system may also prompt the user to activate a front-facing camera on the user's device to record the encounter with law enforcement. The video may be stored in a server for future access by the user and/or a legal representative.

Once the video conference call is established between the user and the legal representative, the legal representative may have access to the user's profile. For example, the legal representative may be able to view a photo of the user's driver's license and proof of insurance. The system may create an audio/video recording of the video conference call, and may store the recording in a server. The user and the legal representative may be able to access the recording, for example, for use in future legal proceedings. The video recording (of the video conference call or the front facing video from the user's device if a legal representative is not available) may be stored indefinitely or for a predetermined period of time, and may or may not be available for download by the user and/or the legal representative. Although the user and/or legal representative may have access to the video and may be able to share the video with third parties, the video may be stored in a way that prevents manipulation of the video or any metadata associated with the video file. For example, the video file may be "tagged" with application metadata that is stored within the video file itself, and cannot be altered. If any attempt to tamper with the video file or its metadata is made, additional metadata is generated, which will indicate that at least an attempt to alter the video file was made. At the end of the call, the user and the legal representative may provide ratings of each other. The system may aggregate ratings of users and legal representatives and provide various statistics, such as the maximum, minimum, and average ratings for each user and legal representative.

Figure 3:
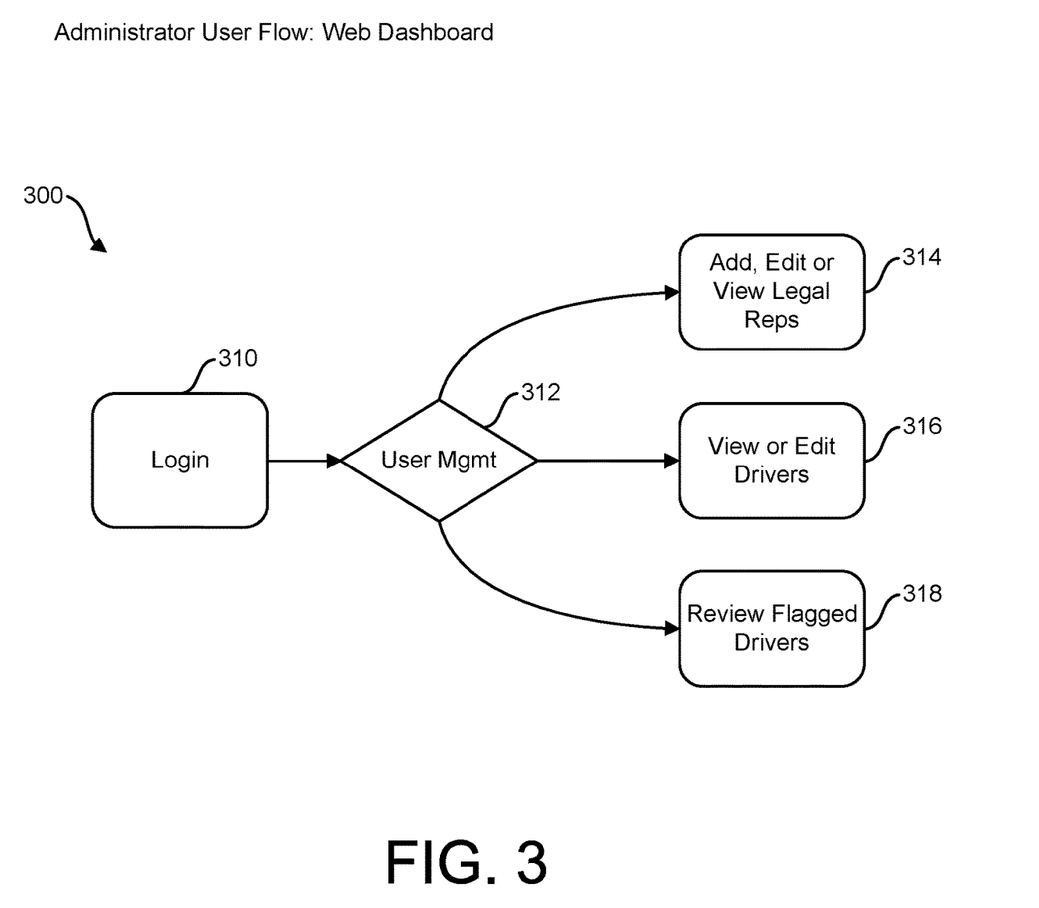
FIG. 3 shows a flowchart depicting an administrator side of the method and system according to one or more examples.

FIG. 3 shows a flowchart depicting an administrator side flow 300 of the method and system according to one or more examples. Referring to FIG. 3, an administrator may enter login credentials, at step 310 which are checked to make sure the entered credentials match previously entered credentials to authenticate the administrator. For example, the administrator login credentials may include the administrator's email address and a password. In addition, there may be multiple administrators that may have separate login credentials, or may share one login credential. Once the administrator has been authenticated, the administrator may conduct various user management operations, at step 312. For example, the administrator may add, edit, or delete legal representatives that may be contacted by a user, at step 314, and may revise bibliographic information, such as phone numbers, for legal representatives. In addition, the administrator may review statistics such as the start time, duration, and end time of conference calls in which a particular legal representative has participated, and the amount or percentage of time the legal representative has indicated an active status. The administrator may also view the basis for any flags associated with the legal representative. For instance, the system may flag a legal representative's account if the legal representative has conducted more or less than a certain number of calls within a given period. The system may also flag a legal representative's account if the representative has calls that have lasted more or less than certain maximum or minimum duration.

The administrator may also view or edit drivers that are able to use the system, at step 316. For example, the administrator may update contact information for users, and may suspend or activate users, for example, based on whether the user has paid for access to the system. In addition, the administrator may view the user's history of calls made with legal representatives, and may view stored videos of the calls with legal representatives. The administrator may also review flagged drivers, i.e., those who have been flagged by the system for various reasons, at step 318. For example, the system may flag a user that has initiated a call request to a legal representative more than a predetermined number of times (e.g., 3) within a given period of time (e.g., 30 days). Alternatively, the system may flag a user based on negative feedback provided by a legal representative who has previously interacted with the user. The administrator may review the basis for the user's flag, and may remove the flag, suspend the user's ability to use the system, or take other actions to further monitor the user's activity. The system may send an email to the user notifying the user of any changes to the user's account.

The administrator may also view aggregate statistics for all users and legal representatives. For example, the system may track the total number, geographic location, and/or duration of legal representative profiles having an active status, as well as when the legal representative profiles are active (e.g., 7:00 A.M. to 7:00 P.M.). By reviewing aggregate statistics, the administrator may be able to identify certain geographic regions, for example, the may be underserved by the current roster of legal representatives. The administrator may also review or compile statistics relating to the race and/or ethnicity of the user and/or law enforcement officers to determine if certain races or ethnicities are being stopped by law enforcement more frequently than others. The administrator may also be able to view data input by the user regarding the perceived race and/or ethnicity of the law enforcement officer to determine any correlations between the race/ethnicity of the law enforcement officer and users that are stopped by law enforcement officers.

Figure 4A:
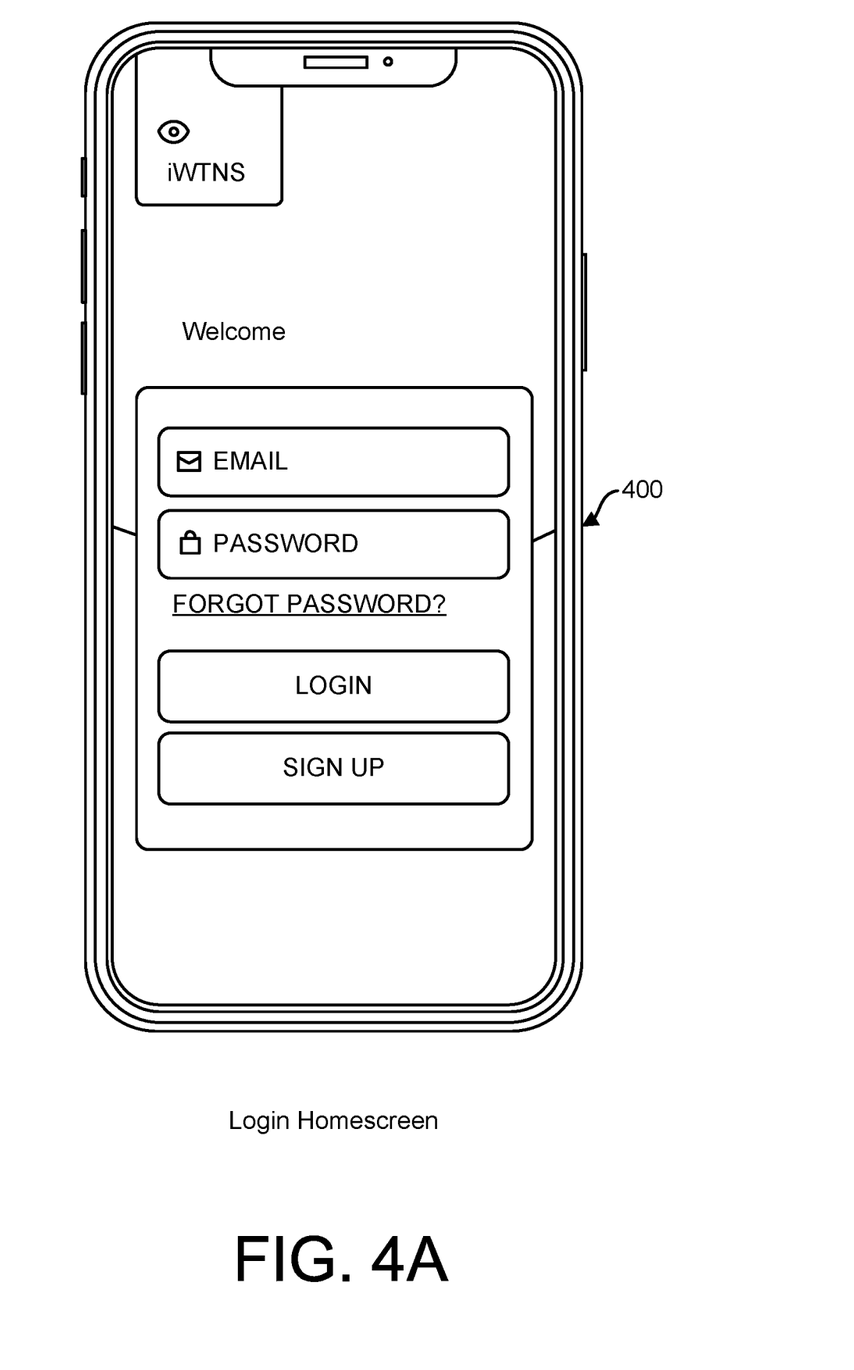
FIGS. 4A-4D show screenshots of the user's device and the legal representative's device during various portions of the method according to one more examples.

FIGS. 4A-4D show exemplary screenshots of the user's computing device and/or the legal representative's computing device according to one more examples. FIG. 4A shows an example of a login home screen 400 that allows a user or a legal representative to login to their account, or to establish a new account. The login home screen may include a user interface that allows the user or legal representative to enter login credentials, such as the user's email address and a password that the user or legal representative has previously established. Alternatively, the login home screen may authenticate the user or legal representative by using facial recognition technology and/or fingerprint identification. In addition, the login home screen may include an option for the user or legal representative to sign up for a new profile, wherein the user or legal representative would enter various personal information to begin user the system.

Figure 4B:
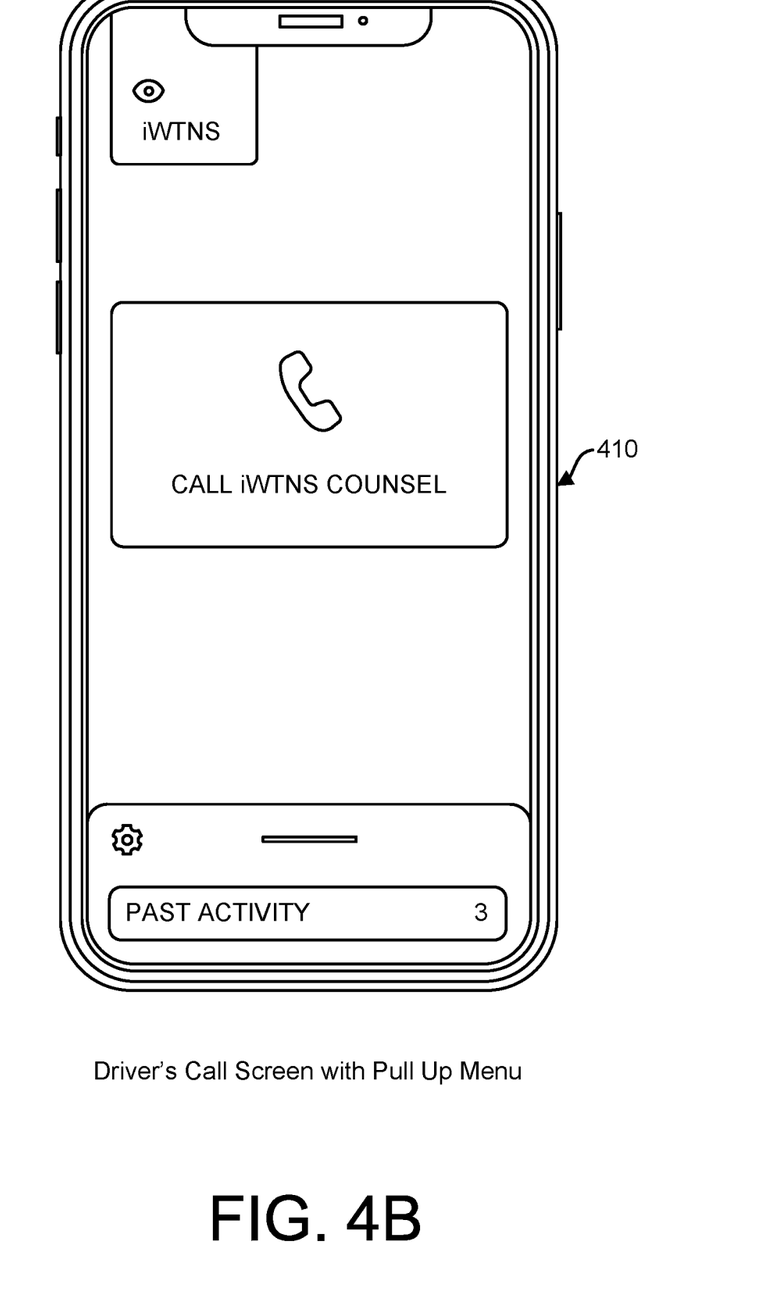
Figure 4C:
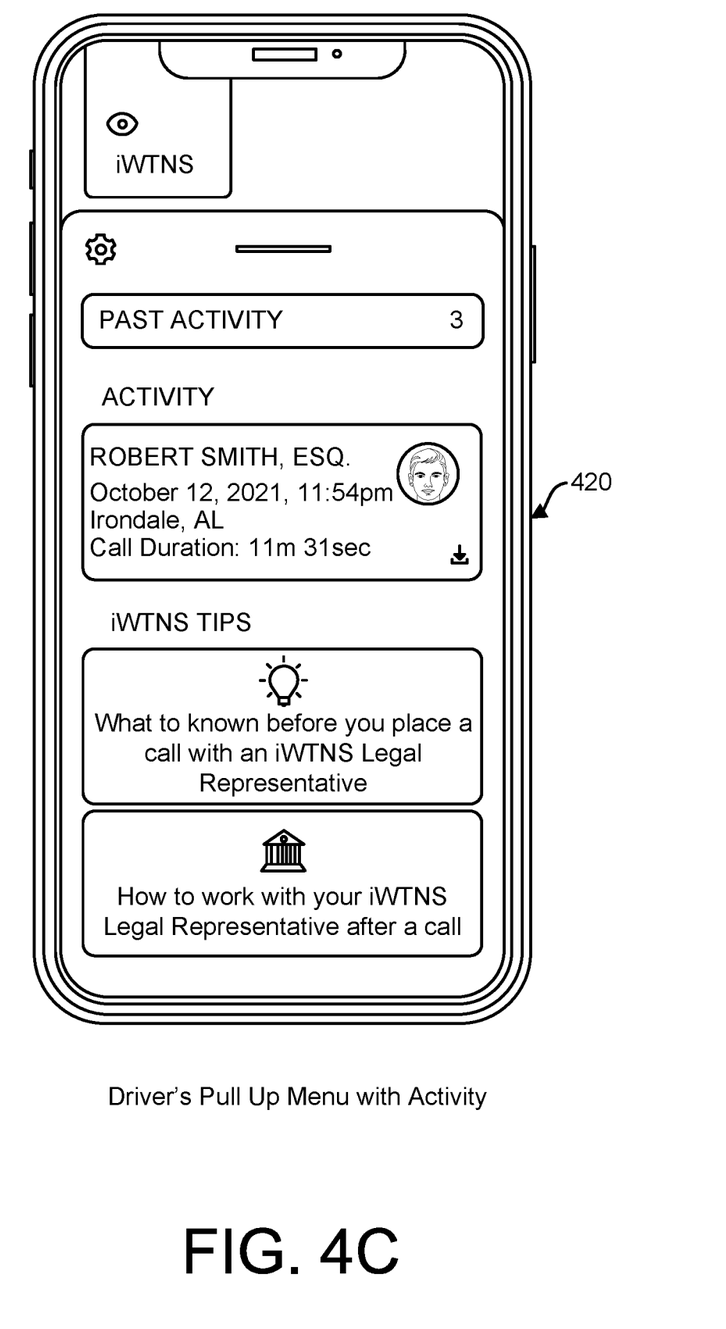

FIG. 4B shows an example of a user call screen 410 that may appear after the user has logged in. The example user call screen may include an option for the user to call a legal representative, as well as a menu to view additional information, such as information regarding previous calls the user has made to a legal representative. FIG. 4C shows an example of a user menu screen 420 that may be provided upon the user selecting the pull up menu from the bottom of the screen in FIG. 4B. The example user menu screen in FIG. 4C may include information regarding past calls, including the name and location of the legal representative, and the date, time, and duration of the call.

Figure 4D:
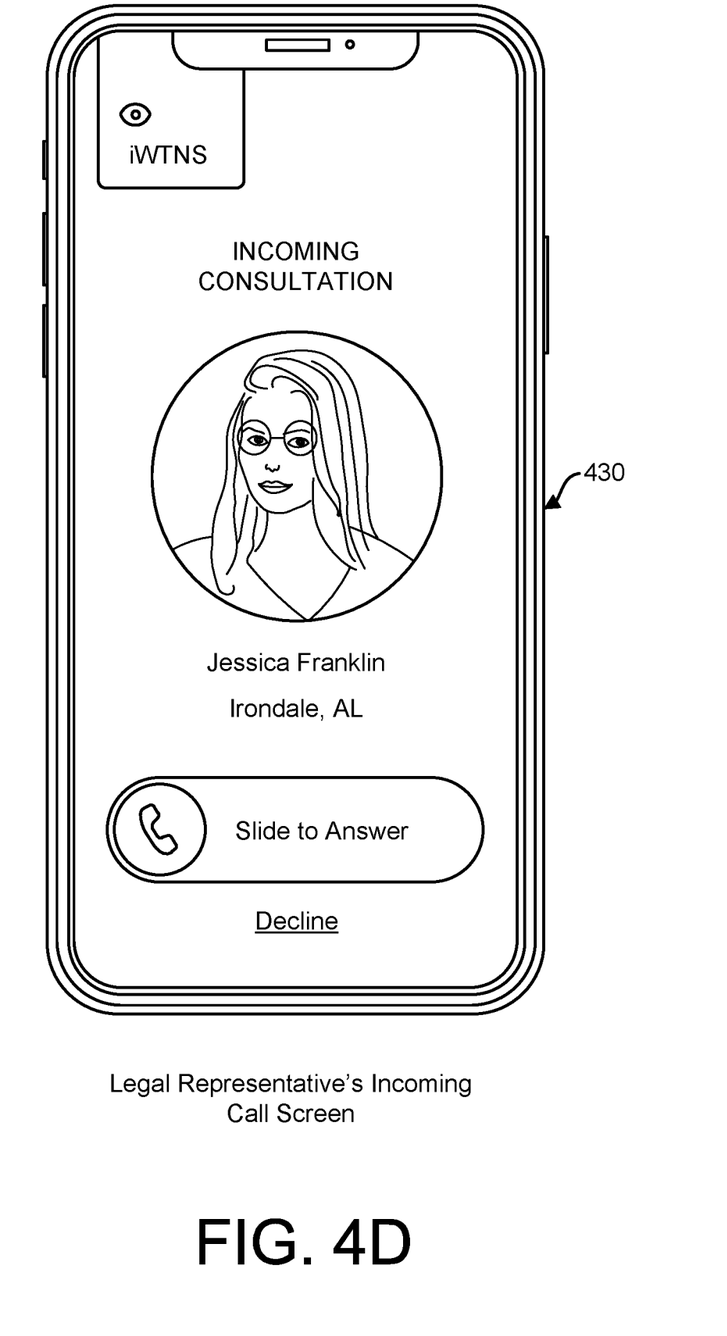

Upon the user selecting the option to call a legal representative in FIG. 4B, a request is generated that may include user information, such as the user's name, location, phone number, etc. The system may identify legal representatives to contact based on the user's location, as explained above. FIG. 4D shows an example of a legal representative's incoming call screen 430, which may appear on the legal representative's device in response to the user initiating a call. The legal representative incoming call screen may include information about the user requesting the call, including the user's name, location, photograph, and other identifying information. The legal representative incoming call screen may allow the legal representative to answer or decline the call. If the legal representative accepts the call, a video conference call is initiated. If the legal representative declines the call, a new legal representative is identified, as described above, and a request is transmitted to the mobile device of the new legal representative.

Figure 5:
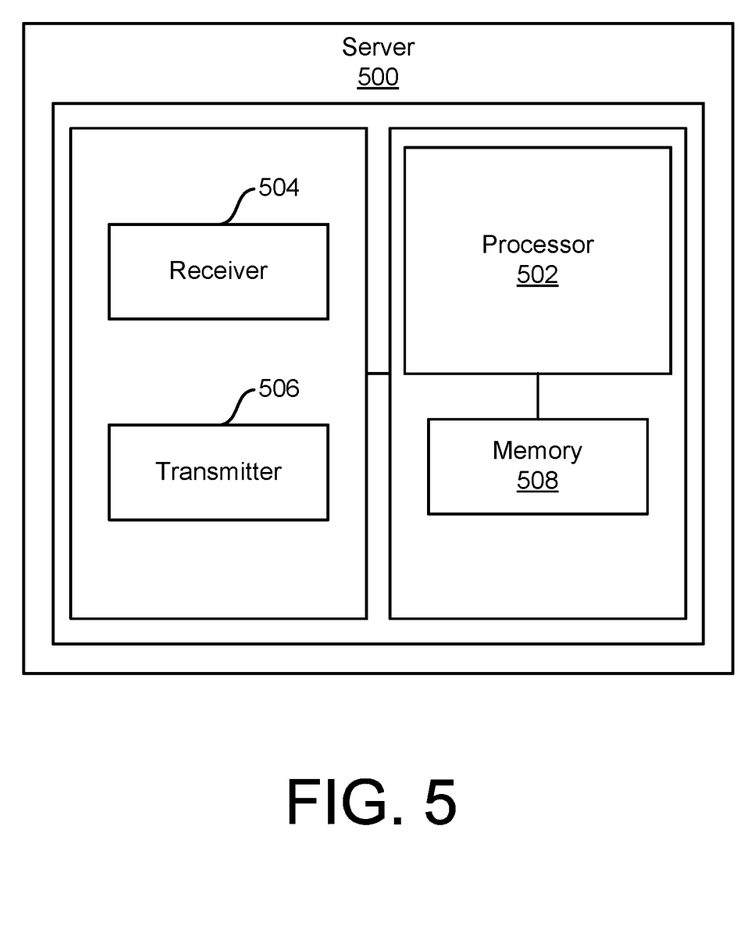
FIG. 5 shows an exemplary server incorporating features of the present disclosure.

FIG. 5 shows a block diagram of an exemplary server 500 that incorporates the methods of connecting a user and legal representative according to the embodiments disclosed herein. Server 500 comprises a processing circuit or a processing module or a processor or microcontroller 502, a receiver or receiver module 504; a transmitter or transmitter module 506; and a memory or memory module 508. Processor 502 includes a microprocessor, an application specific integrated circuit (ASIC), field programmable gate array (FPGA), or the like. Processor 502 controls the operation of server 500 and its components. Memory module 508 includes a random access memory module (RAM), a read only memory (ROM), and/or any type of memory to store data and computer program instructions of a computer program that may be used by processor 502. The execution of the program instructions adapts or configures processor 502 to carry out the operations of server 500 disclosed herein. Further, it should be appreciated that server 500 may comprise additional components not shown in FIG. 5.

In one embodiment, server 500 and its contents are configured to enable a user to establish a video conference with legal counsel during traffic stops or other interactions with law enforcement, is provided. Processor 502 of server 500 is configured to present, on the user's computing device, an option to the user to request a video conference with a legal representative. Receiver module 504 is configured to receive, from the user's computing device, a first request for a video conference, wherein the first request includes user location information based on the user's location. Processor 502 is configured to identify a legal representative by determining whether the user location information corresponds to legal representative location information association with the legal representative and transmitter module 506 is configured to transmit a second request to the legal representative. Processor 502 is configured to initiate a video conference in response to the legal representative accepting the second request.

Various examples have been disclosed herein, in connection with the above description and the drawings. It will be understood that it would be unduly repetitious to literally describe and illustrate every combination and subcombination of these examples. Accordingly, all examples can be combined in any way and/or combination, and the present specification, including the drawings, shall be construed to constitute a complete written description of all combinations and subcombinations of the examples described herein, and of the manner and process of making and using them, and shall support claims to any such combination or subcombination.

It will be appreciated by persons skilled in the art that the examples described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method for enabling a user to establish a video conference with legal counsel during traffic stops or other interactions with law enforcement, the method comprising:
    logging into a system from the user's computing device using an input credential;
    accessing past video from the system to the user's computing device;
    presenting, on the user's computing device, an option to the user to request a video conference with a legal representative;
    receiving, from the user's computing device, a first request for a video conference, wherein the first request includes user location information based on the user's location;
    identifying a legal representative by determining whether the user location information corresponds to legal representative location information associated with the legal representative;
    transmitting a second request to the legal representative; and
    initiating a video conference in response to the legal representative accepting the second request,
    wherein once the legal representative has been identified, further comprising determining if the identified legal representative is available by verifying status information corresponding to the legal representative.

2. The method of claim 1, further comprising, in response to the identified legal representative not accepting the second request or being unavailable, identifying a second legal representative by determining whether the user location information corresponds to legal representative location information associated with the second legal representative and initiating a video conference with the second legal representative in response to the second legal representative accepting a third request.

3. The method of claim 1, wherein the user location information includes at least one of a zip code, a city, and a state where the user is located at the time of the interaction with law enforcement.

4. The method of claim 3, wherein identifying the legal representative by determining whether the user location information corresponds to legal representative location information associated with the legal representative comprises determining if the legal representative location information includes the same zip code as the zip code in which the user is located at the time of the interaction with law enforcement.

5. The method of claim 3, wherein identifying the legal representative by determining whether the user location information corresponds to legal representative location information associated with the legal representative comprises determining if the legal representative location information includes the same city as the city in which the user is located at the time of the interaction with law enforcement.

6. The method of claim 3, wherein identifying the legal representative by determining whether the user location information corresponds to legal representative location information associated with the legal representative comprises determining if the legal representative location information includes the same state as the state in which the user is located at the time of the interaction with law enforcement.

7. The method of claim 1, further comprising creating an audio/video recording of the video conference between the user and the legal representative.

8. The method of claim 7, further comprising providing access to the audio/video recording to at least one of the user and the legal representative.

9. The method of claim 1, further comprising prompting the user to activate a camera on the user's computing device to record the encounter with law enforcement.

10. The method of claim 1, further comprising:
receiving ratings of identified legal representatives who have conducted a video conference with a user;
receiving ratings of users who have conducted a video conference with a legal representative; and
aggregating at least one of the legal representative ratings and the user ratings to form statistics about at least one of the identified legal representatives and the users.

11. The method of claim 1, wherein the input credential further comprises a dual authentication.

12. A system for enabling a user to establish a video conference with legal counsel during traffic stops or other interactions with law enforcement, the system comprising a transmitter module, a receiver module, a processor and a memory, the processor configured to:
present, on the user's computing device, an option to log into the system using an input credential;
present, on the user's computing device, an option to access past video from the system;
present, on the user's computing device, an option to the user to request a video conference with a legal representative;
the receiver module configured to receive, from the user's computing device, a first request for a video conference, wherein the first request includes user location information based on the user's location;
the processor configured to identify a legal representative by determining whether the user location information corresponds to legal representative location information associated with the legal representative;
the transmitter module configured to transmit a second request to the legal representative; and
the processor configured to initiate a video conference in response to the legal representative accepting the second request,
wherein once the legal representative has been identified, the processor configured to determine if the identified legal representative is available by verifying status information corresponding to the legal representative.

13. The system of claim 12, wherein in response to the identified legal representative not accepting the second request or being unavailable, the processor further configured to identify a second legal representative by determining whether the user location information corresponds to legal representative location information associated with the second legal representative and initiating a video conference with the second legal representative in response to the second legal representative accepting a third request.

14. The system of claim 12, wherein the user location information includes at least one of a zip code, a city, and a state where the user is located at the time of the interaction with law enforcement.

15. The system of claim 14, wherein identifying the legal representative by determining whether the user location information corresponds to legal representative location information associated with the legal representative comprises determining if the legal representative location information includes the same zip code as the zip code in which the user is located at the time of the interaction with law enforcement.

16. The system of claim 14, wherein identifying the legal representative by determining whether the user location information corresponds to legal representative location information associated with the legal representative comprises determining if the legal representative location information includes the same city as the city in which the user is located at the time of the interaction with law enforcement.

17. The system of claim 14, wherein identifying the legal representative by determining whether the user location information corresponds to legal representative location information associated with the legal representative comprises determining if the legal representative location information includes the same state as the state in which the user is located at the time of the interaction with law enforcement.

18. The system of claim 12, the processor further configured to create an audio/video recording of the video conference between the user and the legal representative.

19. The system of claim 18, the processor further configured to provide access to the audio/video recording to at least one of the user and the legal representative.

20. The system of claim 12, the processor further configured to prompt the user to activate a camera on the user's computing device to record the encounter with law enforcement.

21. The system of claim 12, the processor further configured to:
receive ratings of identified legal representatives who have conducted a video conference with a user;
receive rating of users who have conducted a video conference with a legal representative; and
aggregate at least one of the legal representative ratings and the user ratings to form statistics about at least one of the identified legal representatives and the users.

22. The system of claim 12, wherein the input credential further comprises a dual authentication.

* * * * *